United States Patent [19]
Wutz

[11] 3,753,623
[45] Aug. 21, 1973

[54] TURBO MOLECULAR VACUUM PUMP

[75] Inventor: Max Wutz, Hanau, Germany

[73] Assignee: W. C. Heraeus GmbH, Hanau, Germany

[22] Filed: July 27, 1972

[21] Appl. No.: 275,750

[30] Foreign Application Priority Data
July 30, 1971 Germany.................. P 21 38 152.2

[52] U.S. Cl................ 417/424, 415/90, 415/199 R, 308/168, 308/170
[51] Int. Cl............................................ F04b 17/00
[58] Field of Search................... 417/424; 415/90, 415/199 R; 308/168, 170, 172, 134.1; 74/5.7, 5

[56] References Cited
UNITED STATES PATENTS

| | | | |
|---|---|---|---|
| 1,357,420 | 11/1920 | Prestwich............................ | 308/172 |
| 2,342,055 | 2/1944 | Laboulais............................ | 308/168 |
| 2,362,667 | 11/1944 | Schmidt.............................. | 308/168 |
| 2,695,199 | 11/1954 | Blizard............................... | 308/170 |
| 3,168,977 | 2/1965 | Garnier et al...................... | 417/424 |
| 3,238,792 | 3/1966 | Unterbeger........................ | 74/5.7 |
| 3,308,848 | 3/1967 | Johnson et al..................... | 308/170 |
| 3,448,623 | 6/1969 | Fischer............................... | 74/5 |
| 3,456,875 | 7/1969 | Hein................................... | 308/170 |
| 3,628,894 | 12/1971 | Ferguson et al................... | 415/90 |

Primary Examiner—C. J. Husar
Attorney—Robert D. Flynn, Stephen H. Frishauf et al.

[57] ABSTRACT

A housing retains stationary turbine blade rings, extending radially inwardly therefrom; interleaved between the stationary blade rings are rotatable blades, secured to a shaft; the shaft has a lower hollow portion surrounding an upright bolt, extending from the housing. Lubricant under pressure is introduced through a duct centrally of the bolt between the top surface of the bolt and the bottom surface of the lower portion of the shaft, which forms a hollow surrounding the bolt, to journal the bolt, in a hydrodynamic or hydrostatic bearing, and prevent splatter of lubricating oil into the high vacuum region above the lower end of the shaft, and where the turbine blade rings are located.

16 Claims, 4 Drawing Figures

TURBO MOLECULAR VACUUM PUMP

The present invention relates to a turbo molecular vacuum pump and more particularly to a directly driven turbine-type pump in which a vertical shaft is directly driven by an electric motor.

Turbo molecular vacuum pumps, and particularly pumps in which a vertica shaft is used, place severe operating requirements on the bearing; usually, bearings for such pumps are provided above and below the drive, such bearings commonly being radial-type bearings. Axial forces are counter-acted by inclined or tapered bearings, or by separate axial bearings. Ball bearings, as well as slide or sleeve bearings may be used. The drive motor usually is a motor of Intermediate frequency and having a rotational speed of between 20,000 to 100,000 rpm. The motor is frequently directly mounted on the shaft for the rotating turbine blades, or turbine blade rings, or it may drive the shaft over a gearing transmission.

Known gearing arrangements in which ball bearings are used have been found to be very sensitive to oscillations. Lubrication is usually accomplished by means of an oil mist and in spite of lubrication the bearings have a limited life. Known bearing arrangements in which sleeve bearings are used have problems relating to lubrication supply and discharge and particularly removal of oil when the bearing is located above the drive motor. Oil splashes, and spray results, as well as oil mists and vapors which undesirably affect components of the pump surrounding the bearing, or being located in the vicinity thereof. This is particularly applicable when the drive arrangement is within the housing of the turbo molecular vacuum pump, or in a chamber which is capable of being evacuated. Intensive lubrication usually cannot be accomplished with direct drive in a vacuum. Known turbo molecular pumps additionally have the disadvantage that heat removal from the bearing is inefficient.

A turbo molecular vacuum pump has been proposed in which the rotatable parts are located on a hollow shaft which rotates about a fixed hollow bolt or pin (see French Pat. No. 1,304,689) and in which a pair of mutually spaced ball bearings are located in the vicinity of the center of gravity of the rotatable parts. The ball bearings are so arranged that they can accept radial as well as axial forces. They are supplied with lubricant from the hollow portion of the central pin, the lubricant being returned to the hollow portion of the pin without introduction into the chamber capable of evacuation.

This bearing arrangement, while providing reasonably good lubrication, is sensitive to oscillations. The ball bearings are arranged as inclined bearings and can accept only limited forces in certain directions. The load bearing capability of the bearing is low and pumps having high rotational speed thus wear out these bearings rapidly. Heat removal of the drive motor, and heat removal from the bearings has not been considered in this construction.

It is an object of the present invention to provide a turbo molecular vacuum pump which can operate at high speed without oscillations, or with highly damped oscillations and which has a bearing arrangement resulting in long life and being practically free from wear and tear. The heat removal of the rotatable parts, and particularly of the bearing in the drive arrangement should be enhanced by increased cooling of all parts.

Subject Matter of the Present Invention: Briefly, the turbo molecular vacuum pump has a housing from which stationary turbine blade rings extend radially inwardly. A vertical shaft is rotatable in the housing, carrying rotating turbine blades interleaved between the stationary turbine blade rings. The lower end of the vertical shaft terminates in an enlarged portion which is cup-shaped and wholly surrounds an upstanding, vertical bolt extending from the bottom of the housing. Lubricant is introduced under pressure between the upper surface of the bolt and the facing lower surface inside of the cup-shaped element, so that the space between the facing surfaces of the cup-shaped element and the bolt will form a hydrostatic, or hydrodynamic bearing, respectively.

The bearing arrangement is practically free from wear and tear even at extremely high speeds, and has long life. The bearing arrangement additionally has the tendency to suppress oscillations. Oil will not splash out from the cup-shaped space and will not reach the space surrounding the bearing for the turbine rotor, which is particularly important when the turbo molecular pump operates in a high vacuum. The lubricant, being supplied under pressure, can effectively remove heat, and thus permits starting of the pump at a substantially higher rate, or loading upon start-up to a greater extent. The axial bearing acts as a hydrostatic, or hydrodynamic bearing and retains the rotor practically in floating position.

In accordance with a feature of the invention, the mutually facing surfaces of the cup-shaped element and the bolt are formed to have a, preferably hemispherical, depression and matching projection. This arrangement permits increased loading of the bearing and decreases friction losses. Other shapes than hemispherical, for example conical or rounded frusto-conical can be used.

Radial guidance is preferably obtained by a sleeve or ball bearing arranged between the inner side wall of the cup-shaped element and the outer wall of the bolt. The combined arrangement has particularly low wear and dampens oscillations, even at high speeds. More than one such lateral bearing may be provided in order to provide for better vertical guidance and stabilization of the rotor. The radial bearing may be made unitary with the rotatable part, an arrangement which is particularly suitable for sleeve bearings.

The invention will be described by way of example with reference to the accompanying drawings, wherein.

Figure 1:
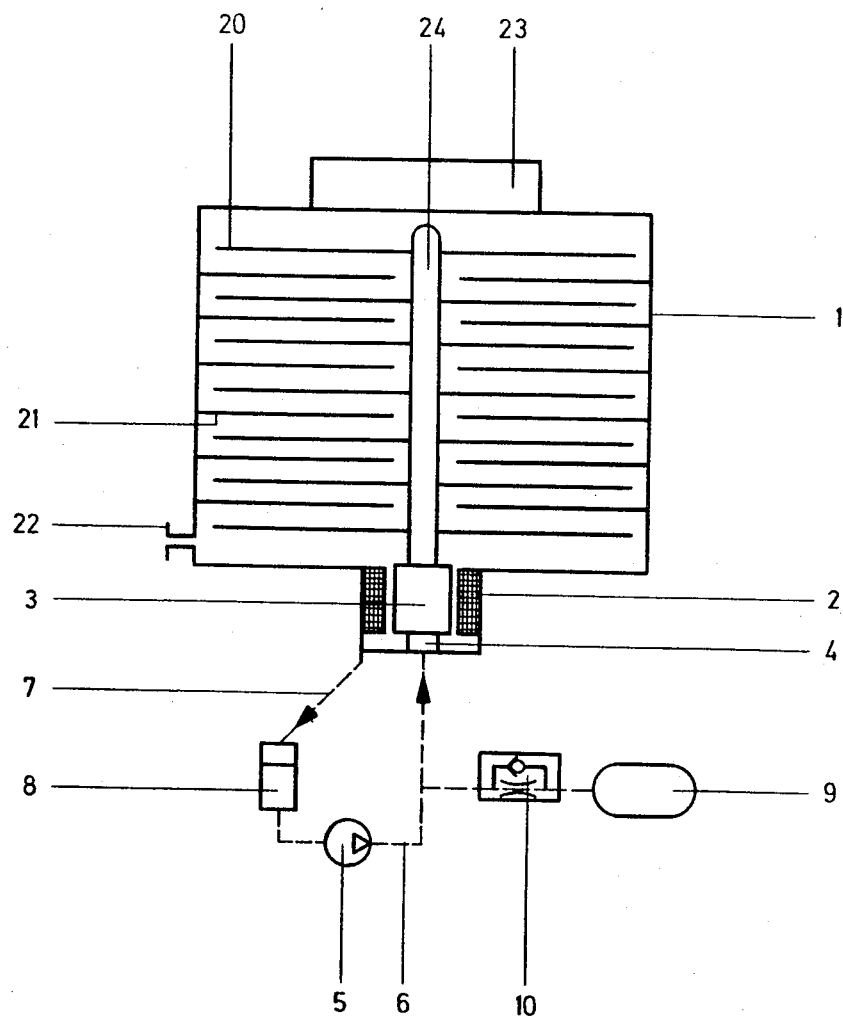
FIG. 1 is a highly schematic vertical sectional view through a turbo molecular vacuum pump, including a forced lubrication circuit therefor.
Figure 2:
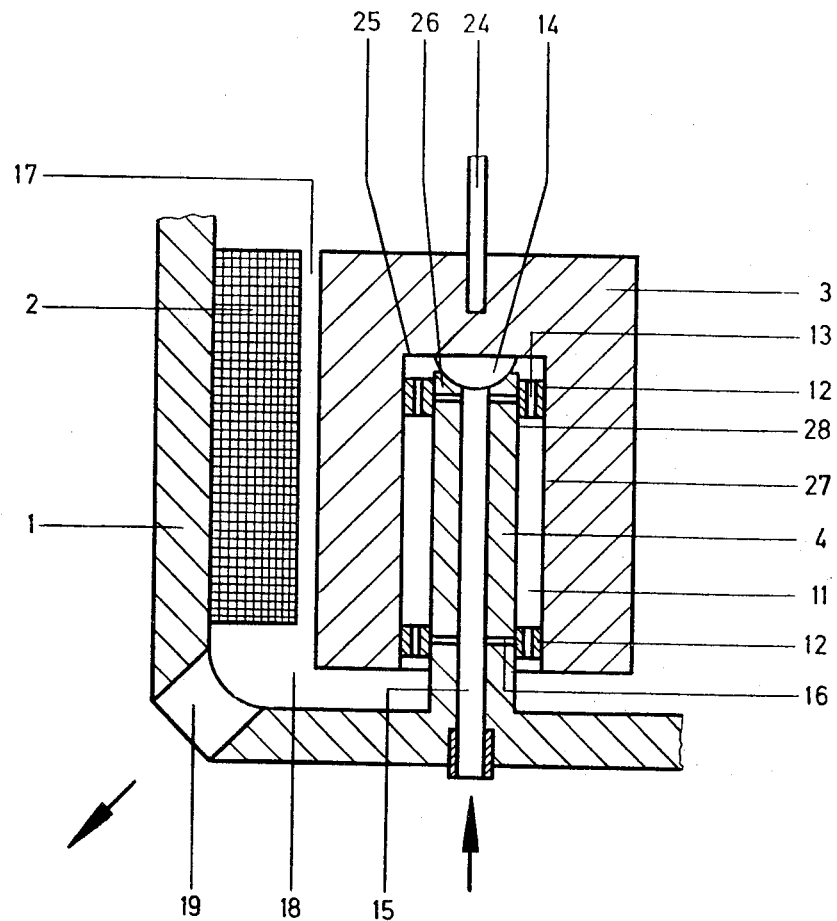
FIG. 2 is an enlarged view of the bearing arrangement for the pump, in fragmentary vertical cross section.

The turbo molecular vacuum pump (FIG. 1) is totally enclosed within a housing 1. The lower portion of the housing 1 forms the drive arrangement for the turbo molecular pump, in the present instance an intermediate frequency motor for example 1,000 Hz having a stator 2, and a rotor 3 (FIG. 2). The rotor 3 is a hollow, cup-shaped body extending co-axially with the shaft 24 and forming part of the rotor of the turbo molecular pump. It rotates on a bolt or pin 4 extending vertically from the housing 1. Lubricant is applied by a volumetric lubricating pump 5 connected to a lubrication pressure line 6 and introduced into a central duct 15 (FIG. 2) formed within bolt 4. Return flow of lubricant is through an opening 19 in housing 1, then through a return line 7 to a de-gassing device 8 and back to the low pressure or inlet side of pump 5. A pneumatic supply of compressed gas 9 is connected over a check valve 10 and choke 10 to the pressure line 6 for the hydraulic fluid to provide lubricant under pressure in case pump 5 should fail.

In normal operation of the turbo molecular vacuum pump, the lubricant supply pump 5 is started before the turbo molecular vacuum pump, so that sufficient pressure of lubricating fluid will build up in the axial bearing and at the upper open end of the duct 15 through bolt 4. The turbo molecular vacuum pump has a rotor assembly formed of the cup-shaped element 3, shaft 24, and rotor blade rings 20. The blade rings 20 are axially spaced from each other, in such a manner that the gaps between the blade rings can receive stationary rotor guide vane rings or blade rings 21. The pump housing 1 is formed with a flange outlet 22 to which an auxiliary vacuum pump can be connected. The high vacuum side of the turbo molecular vacuum pump is located centrally in the upper housing, schematically shown as a flange connection 23. Flange 23 preferably has a relatively large diameter with respect to the outlet 22 and is in fluid communication with space to be evacuated (not shown).

The bearing arrangement itself can best be seen in FIG. 2, in which shaft 24 is secured to, or integral with the lower end portion of the rotor of the turbo molecular vacuum pump. The lower cup-shaped portion 3 also forms the rotor of the intermediate frequency motor, and is located opposite stator windings 2 thereof. A central cavity 11 is formed within the element 3. Central cavity 11 has, in axially staggered arrangement, a pair of sleeve bearings 12 located therein. Rotor 3 and stator 2 of the motor are separated from each other by a thin gap 17. The bearings are formed with axially extending bores or slits 13 to provide a path for return of lubricant to outlet 19 and hence return line 7.

Figure 2A:
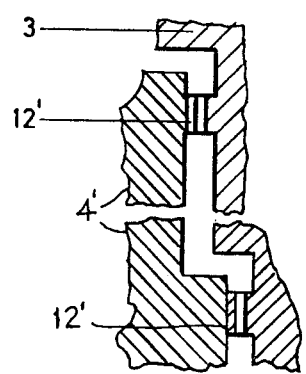
FIG. 2a is a fragmentary partial view illustrating a modified bearing, and a modified shaft and rotor construction.

The cavity 11 can be so formed that the sleeve bearings are entirely part of the rotor element 3, as best seen in FIG. 2a, in which the sleeve bearing extending axially inwardly is integral with the rotor element 3 by having a projecting boss 12' located thereon, which is in running contact with a bolt 4'. Bolt 4' is formed to have an enlarged lower end, against which a similar bearing 12' engages. The change in diameter may be stepped, as shown in FIG. 2a, or gradual, for example by providing a conical bolt 4 and a conical inner wall of the cup-shaped element 3.

The downwardly facing surface 25 within cavity 11 is formed with a projecting bearing element 14. Bearing element 14 preferably is spherical, and is located opposite a depressed surface 26 formed in the top of the bolt 4, so that the rotor can float and adjust its own position on the bearing, in axial direction. Lubricant under pressure is introduced into the cavity 11 through the central duct 15 to provide a film of lubricant under pressure between surfaces 25, 26. Additionally, horizontally extending lubricating ducts 16 pass through the outer wall 28 of the bolt to be applied to the axial bearing 14 and the lateral, radial bearings 12, 12', respectively. The axial bearing thus operates as a hydrostatic, or hydrodynamic bearing. Pump 5 preferably is a volumetric pump having a constant supply volume.

Figure 2B:
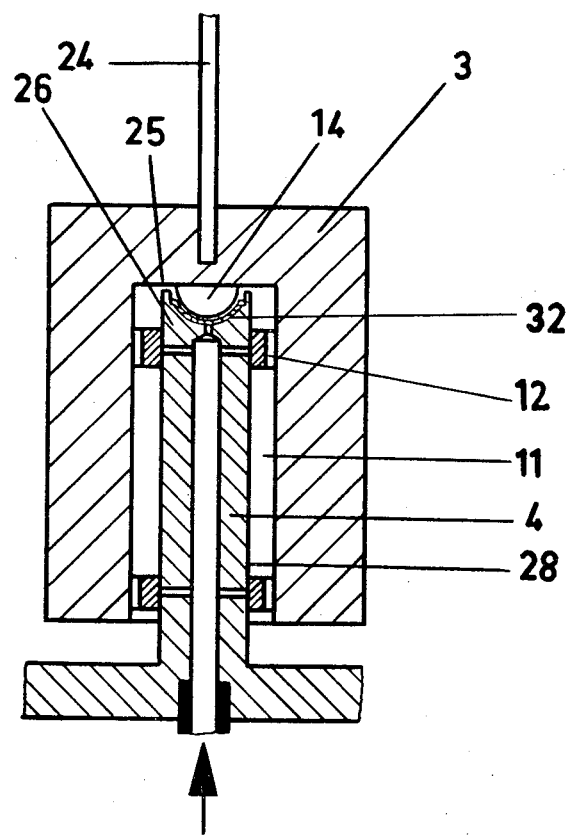
FIG. 2b illustrates another modification of a bearing construction.

FIG. 2b illustrates a structure which in its essential respects is similar to that of FIG. 2, except that the bearing is a hydrodynamic bearing, formed as a spherical, spiral groove bearing 32. Sleeve bearings 12 are provided for radial guidance.

The oil which escapes from bearings 12 (or 12') and from between surfaces 25, 26 is cast by centrifugal force to the inner wall 27 of the cavity 11. From there, and without contacting pin 4, it is guided downwardly so that it is collected, practically without splashing, in space 18 (FIG. 2), to be removed from within the housing 1 through outlet duct 19. If desired, the base wall of housing 1 can be formed with a small baffle extending upwardly, for example slightly above the lower edge of rotor element 3; or a horizontally extending baffle below stator windings 2 may be provided extending towards rotor 3 and out of contact therewith.

Various changes and modifications may be made within the inventive concept.

I claim:

1. Turbo molecular vacuum pump comprising
a housing (1);
stationary turbine blade rings (21) mounted in the housing and extending radially inwardly from the housing walls in parallel, essentially horizontally spaced rings;
a turbine rotor including a vertical shaft (24) rotatable in the housing and rotatable turbine blade rings (20) secured to the shaft and extending radially outwardly from the shaft in parallel, essentially horizontally spaced layers located intermediate the stationary turbine blade rings;
a stationary bolt (4) extending upwardly from the bottom wall of the housing;
the turbine rotor terminating in a hollow lower portion (3) surrounding said bolt (4);
forced lubricating means (5, 6, 15, 16) extending into the space (11) within the hollow portion and the bolt and between the downwardly facing top wall (25) of said lower portion and the top surface (26) of the bolt (4) to fill said space with lubricant and form a hydrostatic and hydrodynamic bearing for the turbine rotor;
and motor means (2) driving said turbine rotor.

2. Turbine pump according to claim 1, wherein the top surface (26) of the bolt (4) and the facing downwardly directed surface (25) of the hollow rotor portion (3) are formed with a mating recess and projection.

3. Turbine pump according to claim 2, wherein the mating recess and projection are substantially hemispherical.

4. Turbine pump according to claim 2, wherein the recess is formed in the top surface (26) of the bolt and the projection extends from the facing surface of the rotor portion.

5. Turbine pump according to claim 1, further comprising at least one radial bearing (12) located laterally between the bolt and the inner surrounding wall of the rotor portion.

6. Turbine pump according to claim 5, wherein one radial bearing (12) is located adjacent the top end of the bolt and another radial bearing is located adjacent the lower end of the rotor portion.

7. Turbine pump according to claim 5, wherein the radial bearing (12') is unitary with the rotatable lower rotor portion.

8. Turbine pump according to claim 1, wherein the cross-sectional area included within the lower rotor portion is smaller in the region adjacent its inner end than in the region adjacent its outer end.

9. Turbine pump according to claim 1, wherein the forced lubrication supply means comprises a longitudinal duct (15) formed in the bolt (4) and connected to a source of lubricant (5, 6) under pressure.

10. Turbine pump according to claim 5, wherein the forced lubrication means comprises a central longitudinal duct (15) formed within the bolt (4) and connected to a source of lubricant (5, 6) under pressure, and lubricant duct means (16) communicating with the central duct (15) and the radial bearings (12).

11. Turbine pump according to claim 1, wherein the forced lubrication supply means comprises a volumetric lubricant pump (5).

12. Turbine pump according to claim 11, further comprising emergency pneumatic pressure means (9, 10) connected to the forced lubricating supply means to apply pressure to lubricant contained therein in case of failure of said volumetric pump.

13. Turbine pump according to claim 1, wherein the motor means comprises an electric motor, the hollow lower portion of the turbine rotor forming the rotor for said motor.

14. Turbine pump according to claim 13, wherein the motor is a medium frequency motor, the stator (2) of which is located opposite the rotor, a sealing gap (17) separating the rotor and the stator.

15. Turbine pump according to claim 1, wherein the forced lubricating means comprises a closed lubricating circuit including lubricant pressure means (5, 6, 9, 10) located externally of the housing;

a duct extending from said pressure means longitudinally through the bolt to supply lubricant under pressure between the downwardly facing inner wall surface (25) of the lower portion (3) of the turbine rotor and the upwardly facing top surface (26) of the bolt (4) and laterally thereof to journal said rotor hydrostatically and hydrodynamically;

and duct means (19) formed in the lubricant connecting return lubricant to the inlet side of the lubrican pressure means.

16. Turbine pump according to claim 2, wherein the mating recesses and projections are formed as a spherical spiral groove bearing (FIG. 2b: 32).

* * * * *